Patented Nov. 20, 1945

2,389,389

UNITED STATES PATENT OFFICE 2,389,389

MANUFACTURE OF SYNTHETIC CAMPHOR

Fryderyk Schwartz, Stockholm, Sweden

No Drawing. Application April 18, 1942, Serial No. 439,610. In Sweden February 12, 1941

9 Claims. (Cl. 260—588)

It is known to manufacture synthetic camphoraceous products from pinene via hydrochloride of pinene.

The object of the present invention is the manufacture of camphor by a simple synthetic method. This new method is mainly characterized in that water or the constituents of water is/are added to p-cymene (p-methyl-isopropyl-benzene). In this process the three double bonds of the latter are saturated by hydrogen and oxygen in the proportions in which said elements occur in water. The reaction may be illustrated as follows:

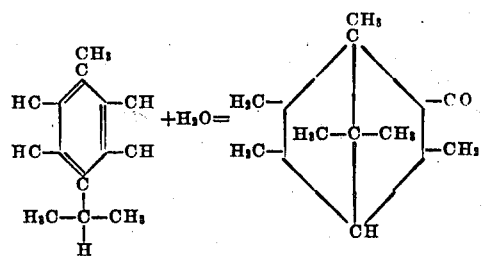

The process is preferably carried out with the use of catalyst, and the reaction is promoted by the use of elevated temperatures. In the manufacture of camphor from cymene and water the latter two substances are intimately mixed with the catalyst to be used. The yield and the time required for the reaction are increased or decreased respectively substantially in proportion to the contacting surfaces of the reactants, especially the contacting surfaces of the reactants with the catalyst.

The invention may be carried out as follows:

p-Cymene and water are dissolved in a medium which is capable of dissolving both of them, e. g. alcohols, such as methyl, ethyl, propyl and isopropyl alcohols, aldehydes, such as acetic aldehyde, ethers, esters and other organic solvents. The solution is boiled for a substantial duration in the presence of finely divided catalysts, for instance mercury or mercury salts, such as mercuric chloride, or other mercury compounds, such as mercurous oxide or mercuric oxide and mercury sulfide, or other metals of that group of the periodic system which comprises mercury or compounds of such metals or organic acids, preferably fatty acids, or salts thereof or arbitrary mixtures of the said catalysts. It is suitable to carry out the reaction at an elevated temperature and preferably at the boiling temperature of the total mixture whereby a satisfactory mixing effect is obtained. The temperature at which the reaction takes place will be lower, the lower the boiling point of the solvent used or of the mixture. Consequently the reaction, when using methyl alcohol, will proceed at a temperature of about 70° C.

The reaction may be effected under superatmospheric pressure, from atmospheric pressure upwards to a pressure at which one of the substances participating in the reaction, or the catalyst is decomposed. The reaction then takes place at a temperature which corresponds to the pressure used.

According to another embodiment of the invention vapours of p-cymene and water or hydrogen and oxygen are passed through a compartment charged with the catalyst. p-Cymene and water may for instance be distilled, and the vapours which are intimately mixed are passed, prior to their condensation, through a compartment charged with finely divided catalysts, the reaction taking place at the boiling temperature of the mixture.

The crude product of the process is usually a solution of camphor in cymene, or, if a solvent has been used, a solution of camphor in cymene and the solvent or solvents used. The camphor is recovered from this crude product and purified in known manner.

The invention will be more fully disclosed hereinbelow, reference being had to three non-limitative examples. The parts indicated in the examples are by weight.

*Example 1*

One of the mixtures defined below is boiled for about 60 hours with the use of a reflux condenser:

(a) 10 parts of p-cymene dissolved in
    50 parts of methyl alcohol,
    5 parts of water and
    8 parts of mercury sulfate;

(b) 10 parts of cymene dissolved in
    50 parts of methyl alcohol and
    5 to 10 parts of water together with
    10 parts of mercury and
    20 parts of precipitated calcium carbonate or magnesium carbonate (for the distribution of the mercury);

(c) 10 parts of p-cymene dissolved in
    50 parts of ethyl alcohol and
    5 parts of water together with
    10 parts of mercury sulfide;

(d) 10 parts of p-cymene dissolved in
    50 parts of isopropyl alcohol and
    10 parts of water together with
    5 parts of stearate, palmitate or oleate of potassium or sodium or any other salt of a fatty acid;

(e) 10 parts of p-cymene dissolved in
    50 parts of propyl alcohol and
    10 parts of water together with
    5 parts of a fatty acid salt and
    5 parts of mercury sulfide.

Example 2

One of the mixtures defined below is boiled for about 24 hours in an autoclave at a super-atmospheric pressure of 10 atmospheres:

(a) 20 parts of p-cymene,
    60 parts of water,
    5 parts of a fatty acid salt;

(b) 20 parts of p-cymene,
    60 parts of water,
    60 parts of mercury sulfide;

(c) 20 parts of p-cymene,
    60 parts of water,
    5 to 10 parts of mercuric chloride.

Example 3

A mixture of p-cymene and water, containing for instance 20 parts of cymene to 60 parts of water is distilled, and the vapours are passed through a pipe over pieces of pumice stone previously impregnated with one or more of the above-mentioned catalysts. The vapours escaping from the catalyzer are condensed in a cooler and the remaining cymene is separated. The cymene is preferably returned to the process.

Example 4

Cymene is boiled and the vapors are mixed with hydrogen and oxygen, the hydrogen and oxygen being in the ratio to each other of substantially 2 volumes of hydrogen to 1 volume of oxygen and the ratio of the hydrogen and oxygen together to cymene vapor being substantially 3 to 1. The mixture is passed through a chamber filled with pumice stone previously impregnated with one of the above-mentioned catalysts. The vapors escaping from the chamber are cooled and the resulting condensate of unchanged cymene and camphor treated for the recovery of its camphor content, the cymene being returned to the process.

As pointed out above, the catalyst may comprise organic acids, such as fatty, resin or wax acids or salts thereof, e. g. stearate, palmitate, oleate of sodium or potassium, or salts of silvic acid, etc.

What I claim is:

1. A method of manufacturing synthetic camphor which comprises reacting p-cymene with a reagent of the group consisting of water and a mixture consisting of 2 parts by volume of hydrogen and 1 part by volume of oxygen in the presence of a catalyst of the group consisting of mercury and mercury compounds at a temperature of at least about 35° C. but not exceeding the decomposition temperature of p-cymene and camphor.

2. A method as defined in claim 1 in which the catalyst comprises an oxygen compound of mercury.

3. A method as defined in claim 1 in which p-cymene and water are reacted in the presence of a mutual solvent.

4. A method of manufacturing synthetic camphor, $C_{10}H_{16}O$, as defined in claim 1, in which vapours of p-cymene and water are passed in contact with the catalyst.

5. A method of manufacturing synthetic camphor, $C_{10}H_{16}O$, as defined in claim 1, in which vapours of p-cymene and a mixture of hydrogen and oxygen is passed in contact with the catalyst.

6. Method as defined in claim 1 in which a mixture comprising p-cymene and water is boiled in the presence of the catalyst.

7. Method as defined in claim 1 in which a mixture comprising p-cymene, water and a mutual solvent is boiled in the presence of the catalyst.

8. A method as claimed in claim 1 in which the catalyst is mercury sulfide.

9. A method as claimed in claim 1 in which the catalyst is mercury and mercury sulfide.

FRYDERYK SCHWARTZ.